US008195140B2

(12) United States Patent
Knezevic

(10) Patent No.: US 8,195,140 B2
(45) Date of Patent: Jun. 5, 2012

(54) CONTROL SOFTWARE FOR UNLOCKING RELOCKING CELLULAR TELEPHONES

(75) Inventor: Ivan Knezevic, Santiago (CL)

(73) Assignee: Pymatuning Communications, San Antonio, TX (US)

( * ) Notice: Subject to any disclaimer, the term of this patent is extended or adjusted under 35 U.S.C. 154(b) by 219 days.

(21) Appl. No.: 12/587,534

(22) Filed: Oct. 8, 2009

(65) Prior Publication Data

US 2010/0136960 A1   Jun. 3, 2010

Related U.S. Application Data

(60) Provisional application No. 61/195,525, filed on Oct. 8, 2008.

(51) Int. Cl.
*H04M 3/00* (2006.01)
(52) U.S. Cl. ........ 455/418; 455/419; 455/403; 370/254; 370/310
(58) Field of Classification Search .................. 455/410, 455/418–419; 370/254, 310
See application file for complete search history.

(56) References Cited

U.S. PATENT DOCUMENTS

| | | | | |
|---|---|---|---|---|
| 2003/0033525 | A1* | 2/2003 | Rajaram | 713/168 |
| 2003/0100290 | A1* | 5/2003 | McGregor et al. | 455/410 |
| 2006/0030306 | A1* | 2/2006 | Kuhn | 455/418 |
| 2006/0168627 | A1* | 7/2006 | Zeinstra et al. | 725/75 |
| 2006/0236111 | A1* | 10/2006 | Bodensjo et al. | 713/176 |
| 2007/0226658 | A1* | 9/2007 | Virk | 715/864 |
| 2008/0176550 | A1* | 7/2008 | Skinner et al. | 455/419 |
| 2008/0304452 | A1* | 12/2008 | Solvsteen | 370/331 |
| 2009/0061840 | A1* | 3/2009 | Fleischman et al. | 455/419 |
| 2009/0181662 | A1* | 7/2009 | Fleischman et al. | 455/419 |

OTHER PUBLICATIONS

QUALCOMM Product Support Tool (QPST TM) 2.7) User Guide, 80-V1400-3 H, Apr. 21, 2005, QUALCOMM Incorporated, San Diego, CA.
UTPST User's Guide, UTStarcom, CDMA Technologies, User's Product Support Tool, Dec. 19, 2005, UTStarcom, Inc., Seoul, Korea.
Dec. 20, 2007 webpage from TelecomArama.com, entitled "The Telecomarama Story", Copyright 2007.
TelecomArama three advertising banners, entitled "We Unlock Cellphones", "We Flash Cellphones" and "We Activate Cellphones", prior to Dec. 20, 2007.

* cited by examiner

*Primary Examiner* — Jean Gelin
*Assistant Examiner* — Nathan Taylor
(74) *Attorney, Agent, or Firm* — William H. Quirk; Alan R. Thiele; Daniel A. Rogers

(57) ABSTRACT

Cellular telephone handsets often include electronic or software coding that "locks" them to a specific wireless network. Provided herein, is a method for provisioning locked handsets by unlocking them from their established network and relocking them on a new cellular network. The handset is connected in communication with the control process, identified, and provisioned. The method allows for provisioning of multiple models and brands to be provisioned from different carriers and to different carriers. It further allows multiple handsets to be provisioned simultaneously. During the process, the handset may be sensitivity tested. Further, the identification portion of the method can be used in conjunction with phone support tools beyond the provisioning process.

3 Claims, 9 Drawing Sheets

CONTROL SOFTWARE FOR UNLOCKING RELOCKING CELLULAR TELEPHONES

This application is based upon and claims priority from U.S. Provisional application Ser. No. 61/195,525, which is incorporated herein by reference.

BACKGROUND OF THE INVENTION

1. Field of the Invention

Applicants' invention relates to software for flashing and reflashing cellular telephones and method for using same.

2. Background Information

Cellular telephones and other wireless communication devices often include electronic or software coding that "locks" them so that certain settings cannot be adjusted, including settings that control which carrier's network the device uses. These locked phones can be "unlocked" so that its settings can be adjusted and made to function on other cellular networks (referred to as "flashing," "reflashing," "provisioning," or "reprovisioning"). Conventional tools for provisioning cellular telephone handsets are generally developed by handset manufacturers for use in directing and locking specific makes and models of handsets to their specific wireless networks.

SUMMARY OF THE INVENTION

The present invention enables a universal tool capable of detecting the make and model of phone or other wireless communication device and automatically provisioning the device for use on one of the many available networks. Most (if not all) of the original equipment manufacturer, or "oem," phone support tools ("PST") are brand name oriented.

The present invention can accept different preferred roaming lists ("PRLs") configurations that correspond to different carriers. The user just chooses which carrier or PRL will load to the handsets, achieving to switch the handset to another carrier's network. There is no limitation in number of different PRLs that can be configured, therefore no limitation in number of different carriers that might be supported in the same time by the system.

The present invention is a robust, Internet (i.e. web-based) application uniquely prepared for massive numbers of handset provisioning. The server can accept thousands of simultaneous connections.

The target handset's receiving performance is measured and compared to the benchmark handset. Again, multi brand and through Internet, meaning massive multitasking signal strength testing is supported.

The method of use of the present invention involves attaching a target cellular telephone such that the software of the present invention is allowed to run and change the internal programming of the telephone.

1. RF Testing Using the Present Invention

The present invention will perform RF sensitivity testing. Plug cable into phone, the present invention determines which handset is being connected. Each kit including the present invention comes with a benchmark handset which is identifiable and cannot be substituted. Calibration is performed to load the test requirement into the present invention. The target handset's performance is measured and compared to the benchmark handset. A maximum permissible degradation compared to benchmark handset determines if target handset passes test or not. A simple screen interface provides the result. The result can be printed out for later identification purposes. If the handset passes the RF sensitivity test, it can then be unlocked and/or programmed for service. If it fails, no further work can be performed on it.

RF testing allows the user to test used phones when they are purchased and reject poorly performing handsets that will cause returns and customer discontent.

RF testing allows the user to provide a service to prospective customers determining whether dropped calls are the result of the system or the handset. Prospective customers may be enticed into seeking services by running such a test.

2. Unlocking Using the Present Invention

Many handsets use technological features, such as a service provider code ("SPC") or master subsidy lock ("MSL") programmed into them, to prevent the phone from being reconfigured to work on another wireless network. Without the use of any proprietary software or hardware from phone manufacturers or network service providers, the present invention is able to achieve connection with virtually any handset or wireless device, determine characteristics of the device, and then unlock the SPC or MSL features ("locks") to allow reprovisioning.

Depending on the make and model of a handset, it may require unlocking of one or both of these two types of locks in order to enable reflashing, while other handsets require circumvention of still other features in addition to the locks.

Unlocking is the necessary first step in reprogramming a handset. Some unlocking systems are available on the Internet but are time consuming, costly, and often do not function properly. Different unlocking tools are required for different handset manufacturers. The present invention is the all-in-one tool that provides unlocking along with its other great features. One tool for all handsets.

3. Flashing Using the Present Invention

Flashing loads a new configuration into the handset allowing the handset to function on a different network. The present invention can flash both the Preferred Roaming List ("PRL") and PRI.

The PRL indicates which networks the handset can lock on to. Each system has a System Identifier ("SID") which is broadcasted by each of the cell sites. Based on the preferred systems defined by the PRL, the handset will look for the proper SID to lock on to. By loading the PRL, any CDMA handset will have voice and text capabilities.

The PRI contains the many (up to 130) specific parameters required for a handset to properly perform data functions such as BREW, WAP, and picture messaging functionality content downloads, Internet browsing.

The present invention allows constant building of its database of handset configurations. Flashing requires the correct configuration for each individual handset type and for each service provider.

4. Use of the Present Invention

The present invention is designed with simplicity in mind. Rather than having to search the Internet for software tools that are hard to use, the present invention is plug-and-play. Plug the appropriate cable into the test handset and in most cases the present invention recognizes the attached handset. If not, a simple drop down menu allows the user to select the right unit based on the identifying label under the handset battery. Simple screens walk the user through a minimal number of steps that perform an RF sensitivity test (screens the phone for RF performance), unlocks the phone, then flashes the configuration for the chosen service provider. The settings are downloaded in seconds, and the phone reboots and locks on to the network. The user can then dial *228 [SEND] and the configured system will send the Mobile ID Number to the handset. Place a test call to ensure that everything is functioning properly and the cell phone is functional.

The present invention offers an inexpensive cable kit or it can be used with other cables. The present invention may be effected by using any machine readable media or over the Internet.

The present invention is designed to both single handsets or large quantities of handsets through a production line quickly and efficiently. Whether used for screening incoming handsets without the use of expensive testing equipment, bulk unlocking, or bulk flashing, the present invention can be applied in all instances.

DETAILED DESCRIPTION OF THE PREFERRED EMBODIMENT

Figure 1:
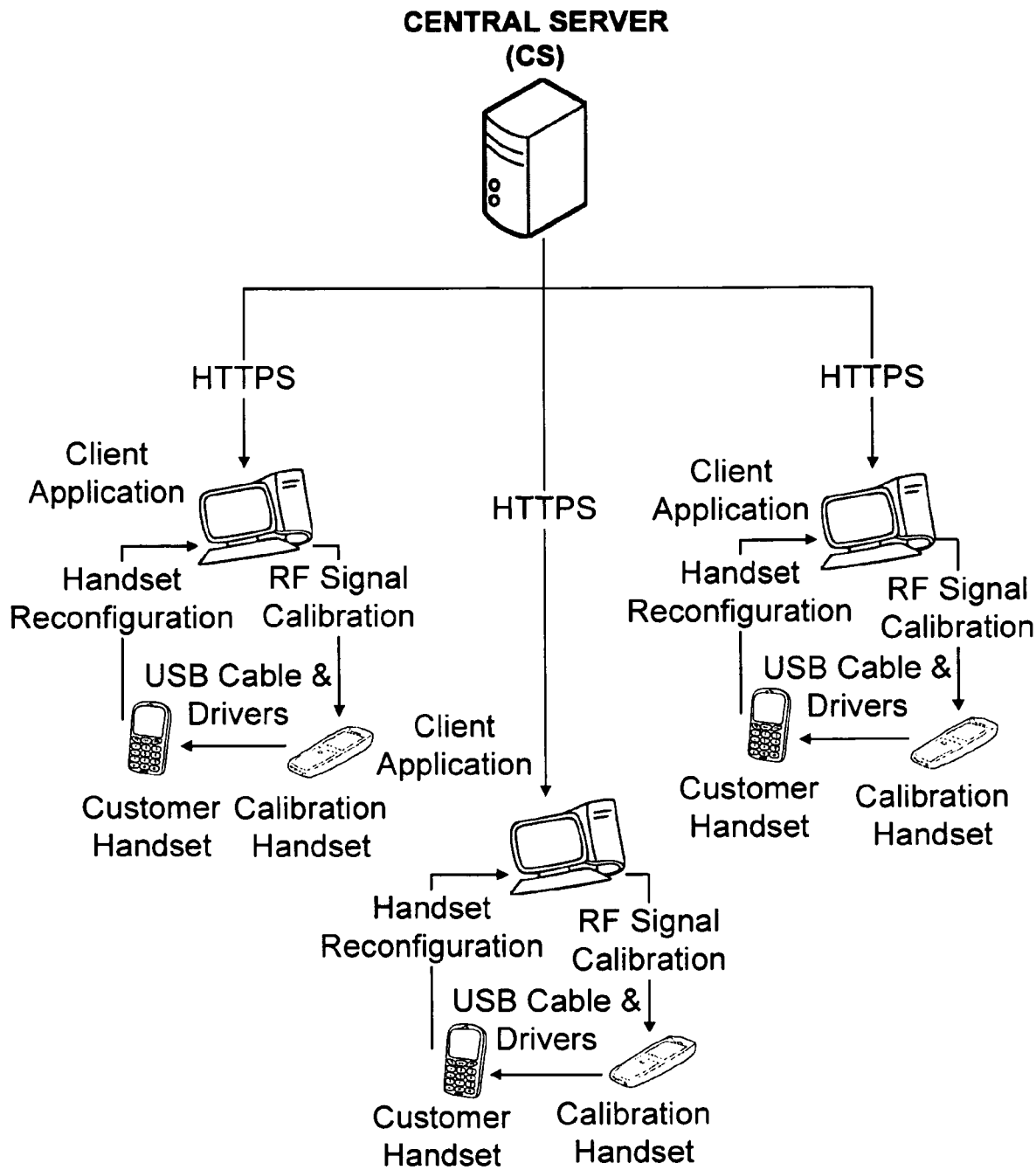
FIG. 1. is a schematic of the present invention illustrating the distribution of the central server and client application of the present invention.

FIG. 1. is a schematic of the present invention illustrating the configuration of an embodiment of the computer system of the present invention. The computer system may include a central server ("CS") and a plurality of local personal computers ("PC"). A client application ("CA") is on the computer system and is programmed with control software to perform the methods for universally provisioning wireless devices and handsets as described herein. The CS administers the control software of the present invention. The local PCs, using the CAs, may access the CS. It is anticipated that the system will incorporate a CS administering the CA's of multiple PCs over a network such as the Internet. However, the control software of the present invention could be installed on a single computing unit and the process would still operate in essentially the same manner. Using the network allows for increased numbers of cellular telephone handsets that can be provisioned simultaneously, and at multiple locations. Wireless devices, both subject and calibration, can be connected to the local PCs, or terminals, via communication cables, so as to allow communication between the handsets and the PCs. The communication cables may include power conductors for conveying a battery recharging current from the terminal to the wireless device. During provisioning, the communication cables also allow transmission of data for modification of the wireless device's data and settings. While FIG. 1 illustrates the handsets connected to the PC's via USB cables, it is anticipated that the connection may be made by any number of types of cables, or wirelessly.

The present invention is capable of provisioning a plurality of makes and models of wireless devices and handsets. The number of makes and models is generally limited only by the requirements of the user. Thus, a first terminal (or PC) may be connected to any of a single make or model of wireless device, any of more than two (2) makes or models of wireless devices, any of more than ten (10) makes or models of wireless devices, or in a preferred embodiment, any of more than thirteen (13) makes or models of wireless devices. The computer system is programmed with the control software that will cause the wireless device to be identified and provisioned (or reprovisioned) any of the said makes or models of wireless devices.

In order to control the function of the CA's over a network, users at individual sites that wish to use the CA must log in to the CS. Use of the CA may be partially limited by a payment or credit system. By making payment or having credits, a user may be allowed to access and use the CS.

The process has the basic parts, after login, of detecting or identifying the subject handset, selecting a target carrier, verifying the setting based upon a model or standard for the target carrier, and provisioning the handset. Provisioning is broken into two main parts—unlocking the subject handset from the existing carrier and locking it to the new carrier by loading the parameters for the new carrier.

A sensitivity or RF test may also be completed during the process by the CA. It may be done independently, or as a part of the provisioning steps. The sensitivity test compares readings from the subject handset to those of the calibration handset. Because of this, the user and new carrier can be more sure that the subject handset will function correctly on the new carrier.

Additionally, the identification process can be used separately from the provisioning process. Phone support tools ("PST") are available for various handsets. Therefore, using the selection portion of the present invention, a user can more easily implement PST's because the control software can automatically identify the handset. Then, desired PST's that are specific to the identified handset can be implemented.

The system also allows for the generation of details reports regarding the handset and provisioning process. This can be beneficial so that carriers can identify what phones are on its network, confirm that the RF test was passed, obtain RF values, obtain electronic serial numbers, and many other values.

Figure 2A:
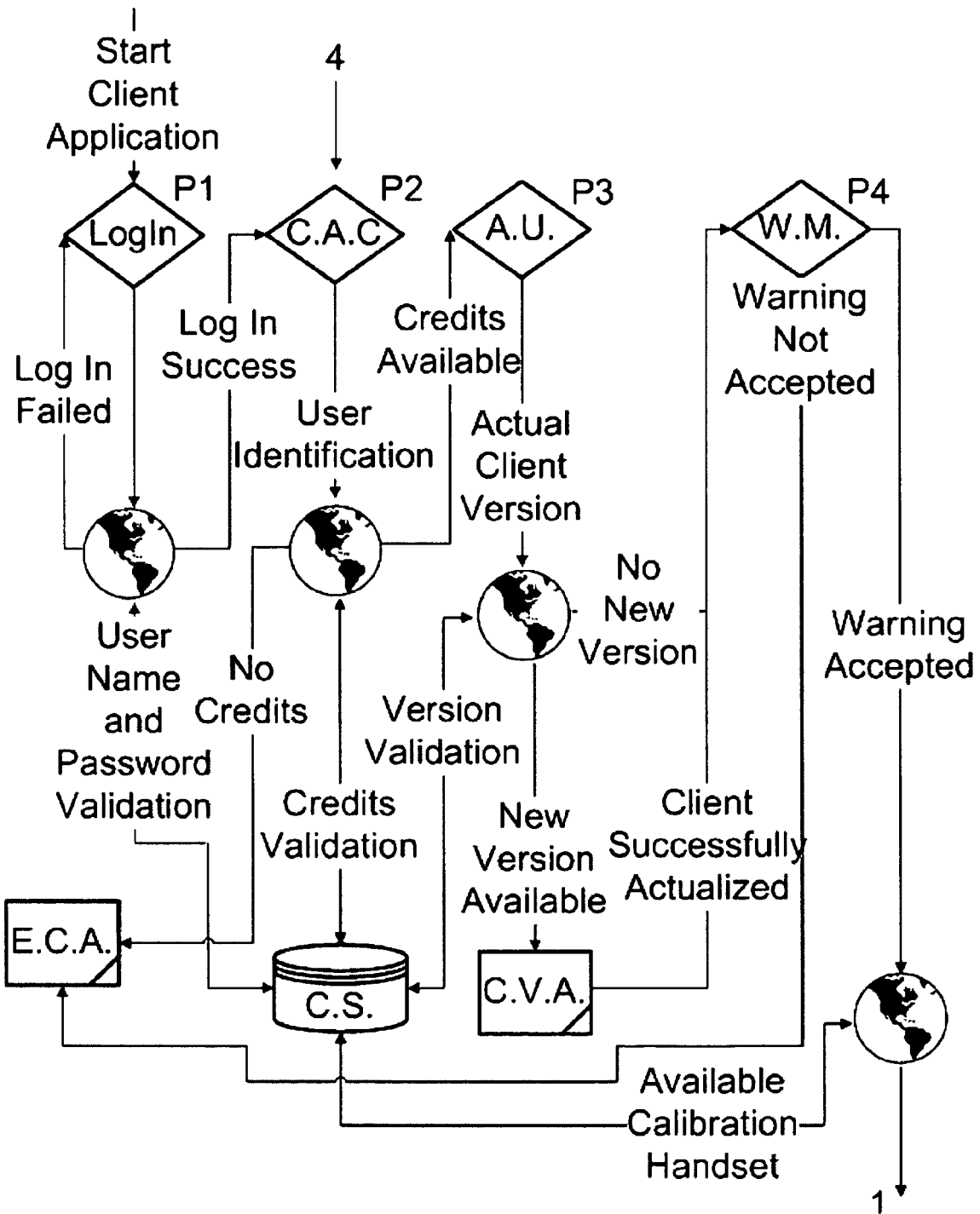
FIGS. 2A-C. make up a flow chart illustrating the general process of the present invention.
Figure 2B:
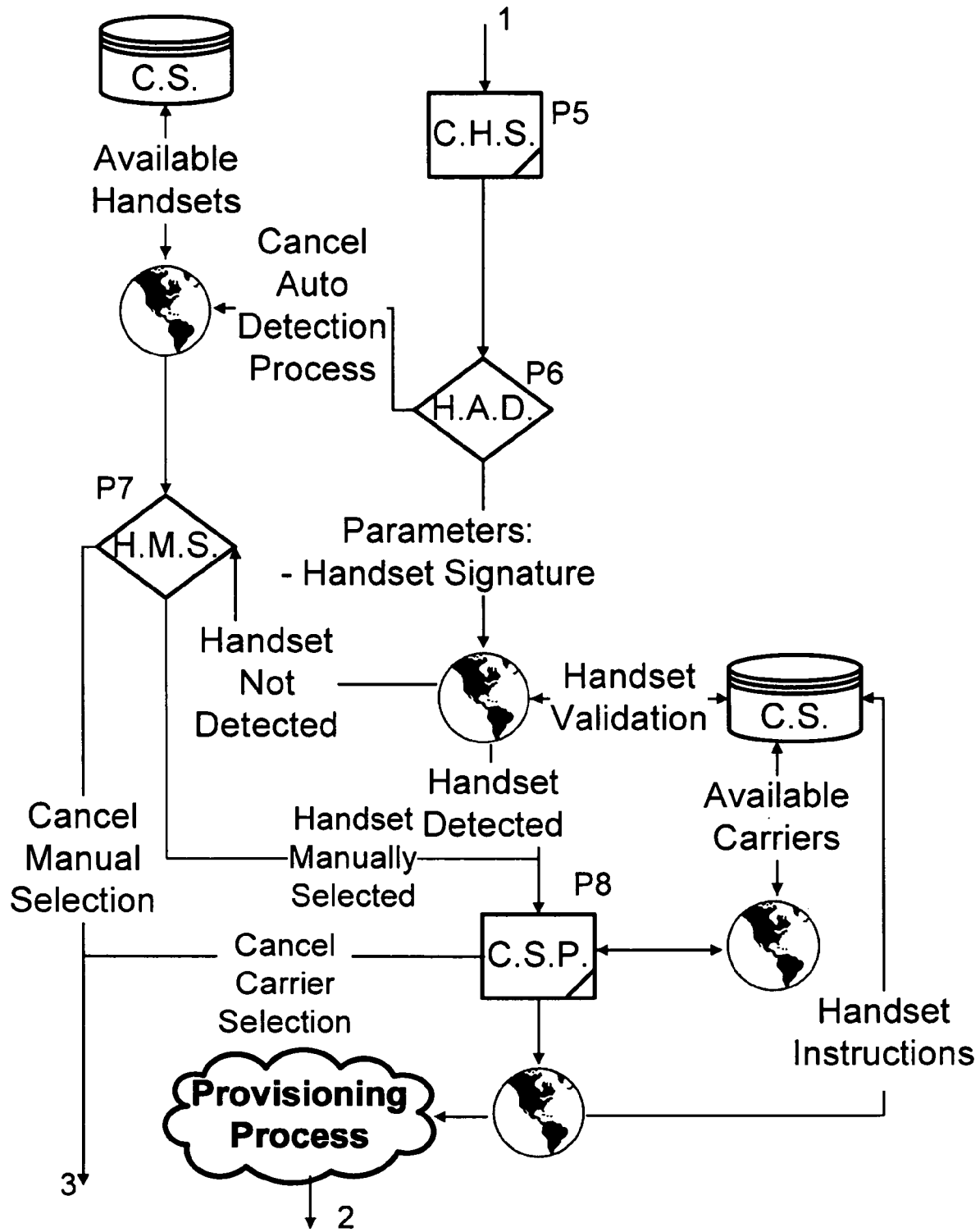
Figure 2C:
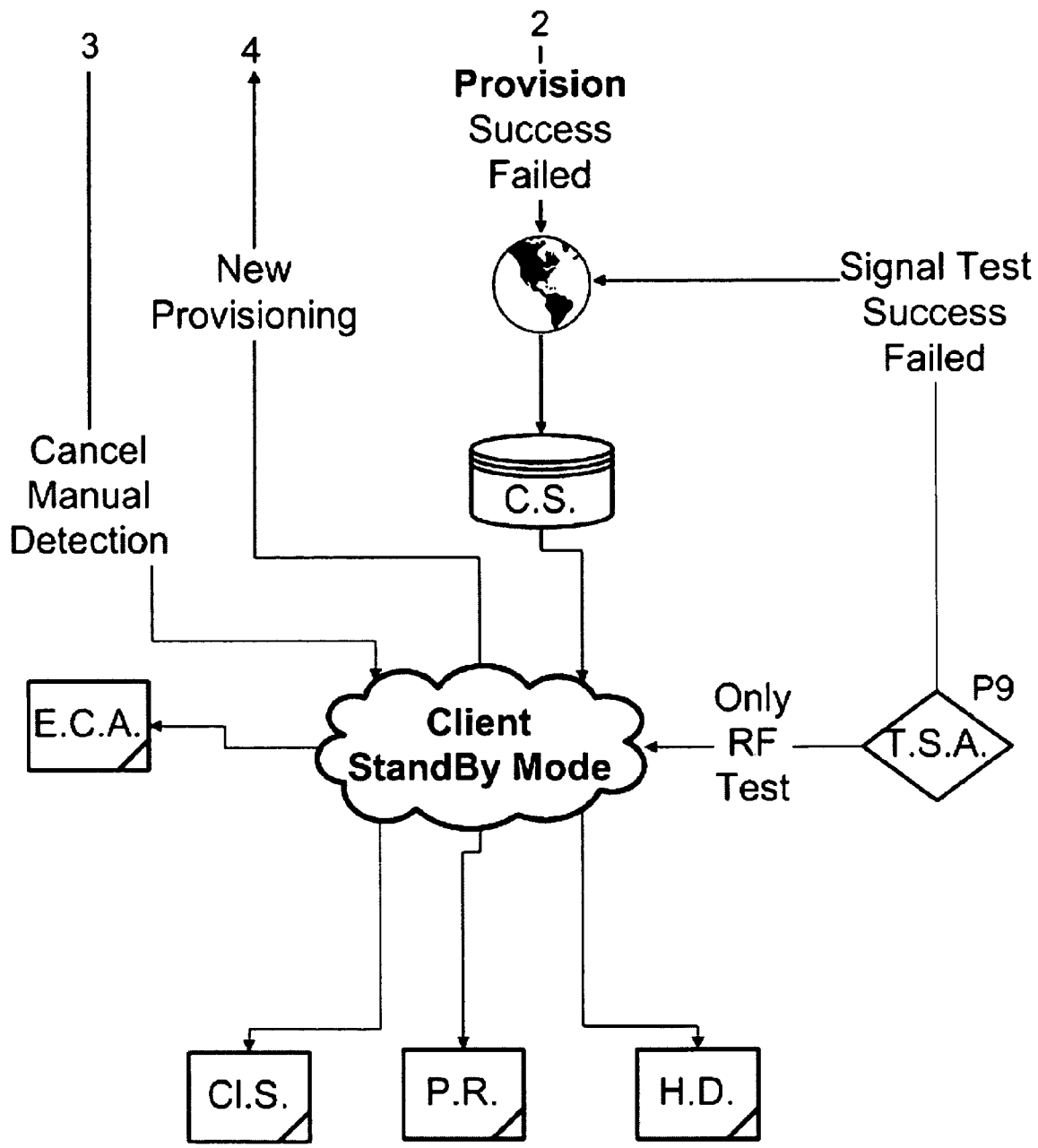

FIGS. 2A-C. illustrate the general process of the present invention for the provisioning of cellular handsets of a client or user using the control software. Abbreviations used in FIGS. 2A-C are as follows:

C.A.C.=Check Available Credits
A.U.=Automatic Upgrades
W.M.=Warning Message
C.V.A.=Client Version Actualization
E.C.A.=End Client Application
C.H.S.=Calibration Handset Selection
H.A.D.=Handset Auto Detection
H.M.S.=Handset Manual Selection
C.S.P.=Carrier Selection Process
T.S.A.=Test Stand Alone (RF)
C.S.=Central Server
Cl.S.=Client Settings
P.R.=Provisioning Reports
H.D.=Help Desk Because it is anticipated that the present invention may be operated over the Internet, this may involve the login by the user. However, it is also anticipated that the CA may be used as a stand alone, non-web based application, that may not require logging in. For a web-based CA, at step P1, the CA connects to the central server ("CS") using a secure connection, such as a hypertext transfer protocol secure ("HTTPS") connection, to the web server. For such a login, the CA requests that the user provide a valid username and password to connect. The last successfully logged in username may be remembered and therefore only the password will be required in most cases. The CA is unable to provision handsets without a valid username and password and a valid HTTPS connection to the CS.

Once the username and password are successfully validated, the CA user interface automatically configures in relation with preconfigured user rights hierarchy. (In a non-web version, the user rights hierarchy might be determined by the type of license purchased by the user, or other user definitions.)

In an anticipated embodiment, the user rights hierarchy is grouped into three (3) levels of accounts. The accounts are: corporate (the highest grouping level), Master (a regional grouping), and manager (for local locations). In this embodiment, the user rights hierarchy is further grouped into five (5) types of users.

Power Users can create any type of accounts and perform all necessary associations within accounts. A Power User can create all Corporate, Master, Manager and Simple Users. A Power User can see provisioning reports for all the transactions performed by all users grouped by corporate, master or manager accounts. Additionally, a Power User has access to special "cube" cross-reference reporting.

Corporate Users can see provisioning reports for the transactions performed by all Master, Manager and Simple User members of all master and manager accounts associated with the Corporate User's Corporate Account, but a Corporate User cannot create or edit any Users.

Master Users can create manager accounts associated to the Master User's master account. A Master User can create Manager and Simple users for any of the manager accounts associated to the Master User's master account. A Master User can see provisioning reports for the transactions performed by all Manager and Simple User members of all master and manager accounts associated with the Master User's master account. But, a Master User cannot create other Master users.

Manager Users can create Simple Users only for the Manager User's manager account. A Manager User can see provisioning reports for the transactions performed by Simple User members of the Manager User's manager account. But, a Manager User cannot create other Manager users.

Simple Users can see provisioning reports only for transactions they have performed. Simple Users cannot create any type of users.

It is anticipated that hierarchy could be configured differently and to meet given requirements in other embodiments.

The present invention may require payment by a user in order to provision a handset. Thus, step P2 checks available credit of the user. The credit check has two (2) basic modes of operation: a prepaid mode in which, to be able to continue with the handset provisioning, the master account of the connected user must have positive credit balance, or a postpaid mode in which Check Available Credit is not performed on the master account, but the user is billed on a specified basis such as net 30.

In step P3, an automatic upgrade is performed. The current version of the CA is compared with the most recent version of the CA. The new version (if any) of the CA is automatically downloaded from CS and auto installed locally to the user's PC. Software updates may be detected right after connecting to the CS and the available credit check is performed.

Step P4 can provide a client warning message if necessary. The CA warns the user by displaying a client warring message. Any text can be displayed there, such as text that warns the user of eventual handset damage. The user can be given the choice to accept or reject the warning, but the CA may be configured such that if a user does not accept the client warning message, the CA will be automatically closed. In this configuration, it is mandatory to accept the client warning message.

Step P5 provides for a sensitivity test on the handset to be provisioned. The user chooses the calibration handset from a list of allowed calibration handset models from the CS. (Permitted calibration handset models are configured on the CS per each master account. Additionally, there is a parameterization option to setup on the CS and follow allowed ESN numbers for calibration handset (configured per master account)-fraud protection. In order to perform the sensitivity test, the present invention employs RF comparing neg-gain criteria, which is configured per the master account and stored on the CS. An additional parameterization option is to configure on CS (per the master account) whether the RF Test is mandatory or not. If for the particular master account the RF test is configured to non mandatory, the CA will permit the user to continue without selecting calibration handset.

Step P6 provides for the detection of the type of handset to be provisioned. The handset detection may be automatic or manual. If automatic, the CA scans for all handsets connected to the user's PC through data cables with the objective to auto detect all connected calibration handsets and handsets to be provisioned. The CA scans by detecting all or some of the PC's communication ("com") ports. Many PC's can have hundreds of COM ports, therefore it can be advantageous in terms of detection time and computing resources for the CA to allow the user to reduce the number of COM ports scanned for handsets. For example, the present invention allows the user to bypass inactive ports. If a handset is found, the CA obtains the handset's signature from the connected handset and sends the signature to the CS which will then validate/match received signature with all stored and preconfigured signatures of supported handset models on the CS. The signature is a combination of the handset's identifying electronically readable characteristics. Acceptable characteristics include the firmware name, firmware version, handset, version, firmware release date, handset release date, handset build date, name of firmware bin file, ESN, handset brand, handset model, MEID, MDN, MIN1, and MIN2.

The CA may be configured to base its handset identification on a specified number of identifying electronically readable characteristics. Because there is no current engineering standard for phones, it will generally take multiple identifying electronically readable characteristics in order to identify a subject handset, therefore the present invention uses two (2) or more of the identifying electronically readable characteristics. After the subject handset is automatically detected, an option to select a new carrier is displayed to the operator.

If, in step P6, the subject handset is not recognized (not auto detected), then the CA allows the user in step P7 to manually select or identify the subject handset. In this manual detection step, the user selects the correct handset model from a list of available handsets. The list of supported handset models is pulled from the CS. Again, after the subject handset is identified and selected, an option to select a new carrier is displayed to the operator.

Step P8 allows for carrier selection for the subject handset. The user selects the carrier from a list pooled from the CS to which the user wants the handset to be provisioned. It is envisioned that the list may include all or some supported carriers. The carriers are configured on the CS with all particular and related specific configurations, or parameters for the new carrier. The number of, and values, of the parameters are carrier and handset model specific. While there are hundreds of possible parameters, some examples are a preferred roaming list ("PRL") and product release instructions ("PRI"). The list of supported carriers is configured on the CS per master account, therefore only allowed carriers will be displayed to the user for the selection. Once a new carrier is selected, the CS sends to the CA a set of explicit instructions uniquely prepared for the selected carrier and for the identified handset.

ESN refers to an Electronic Serial Number.
MEIC refers to a Mobile Equipment Identifier.
MDN refers to a Mobile Device Number.
MIN1 refers to a first Mobile Identification Number.
MIN2 refers to a second Mobile Identification Number.

Figure 3A:
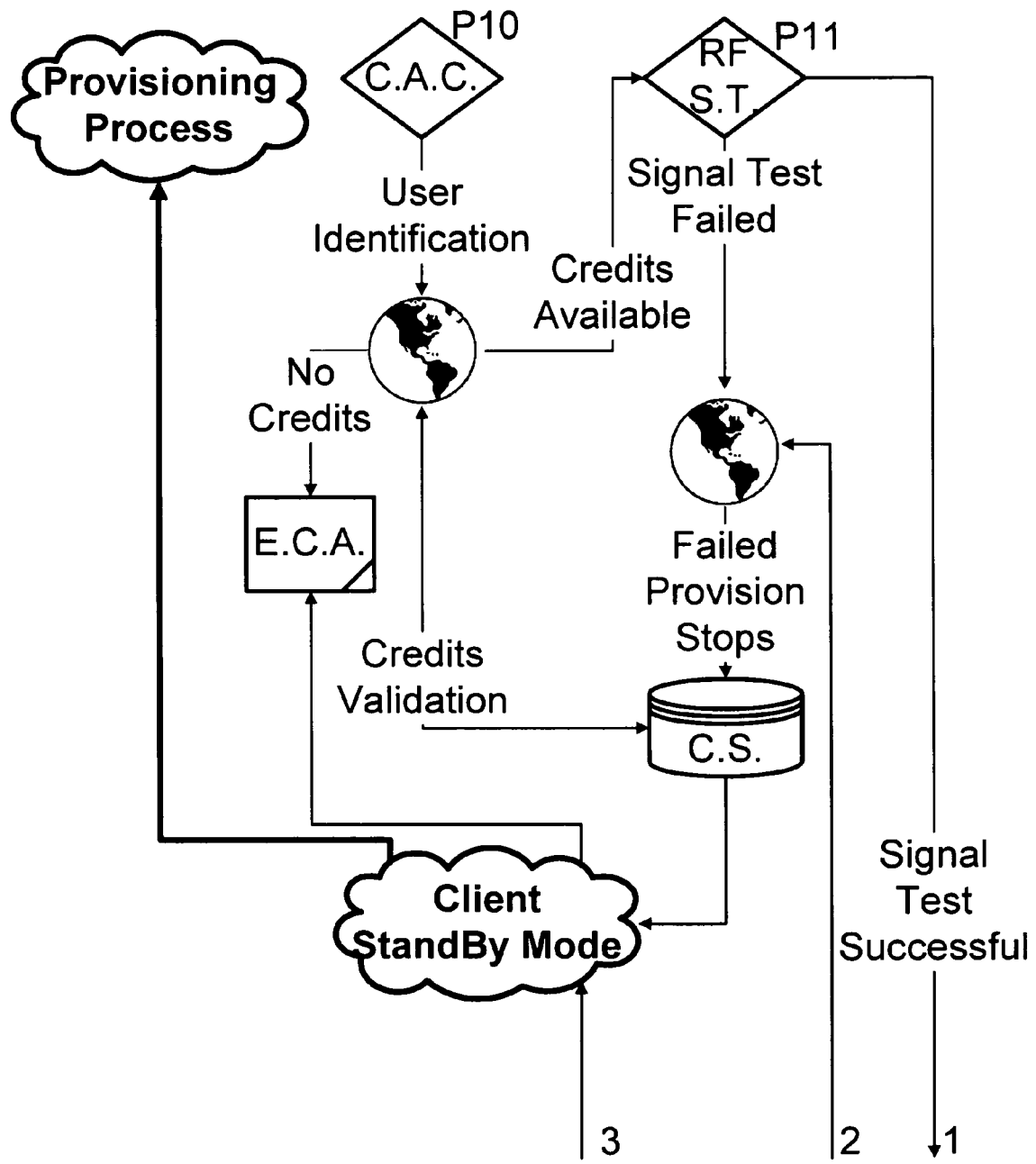
FIGS. 3A-C. make up a flow chart illustrating the provisioning process of the present invention.
Figure 3B:
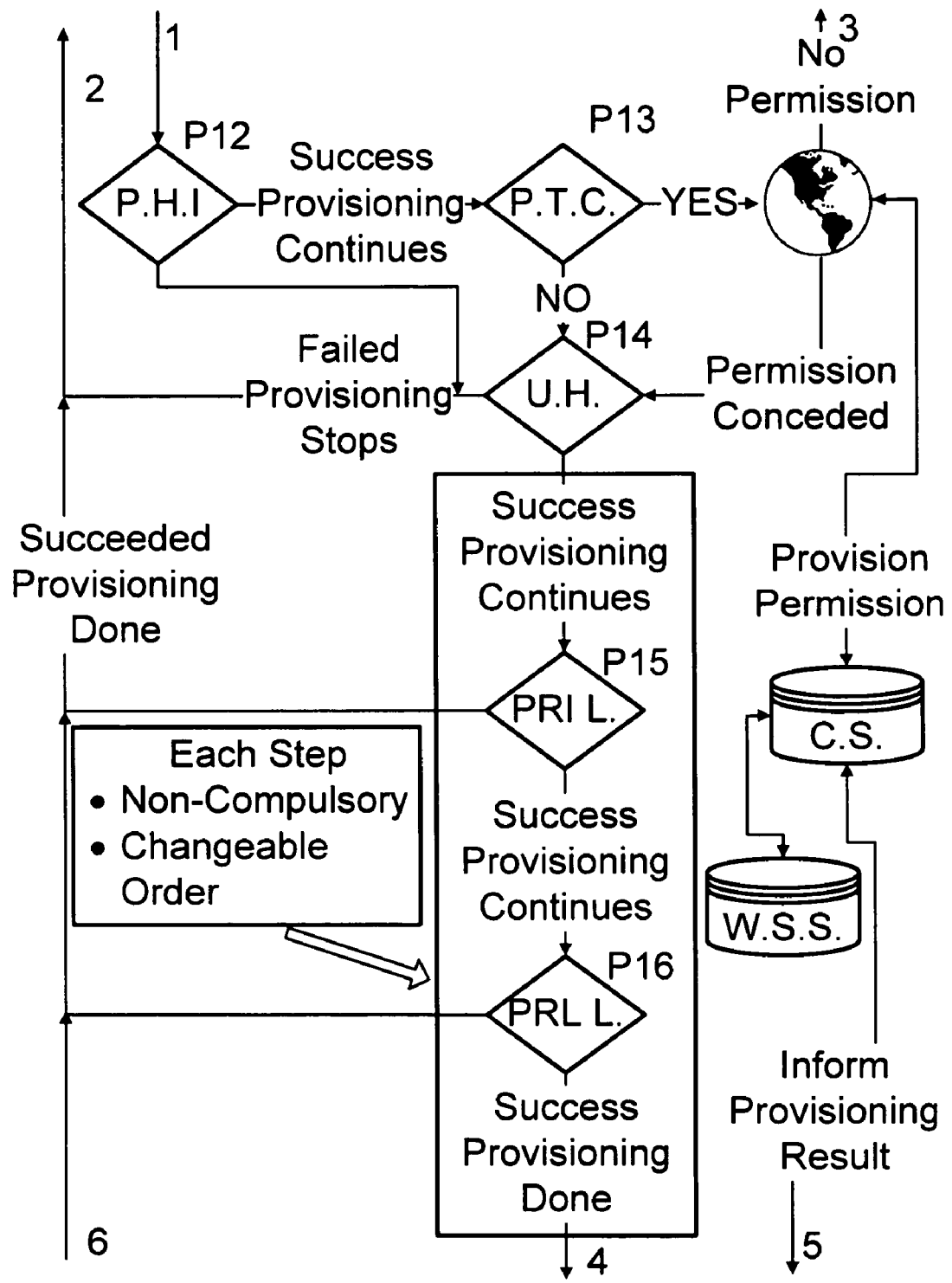
Figure 3C:
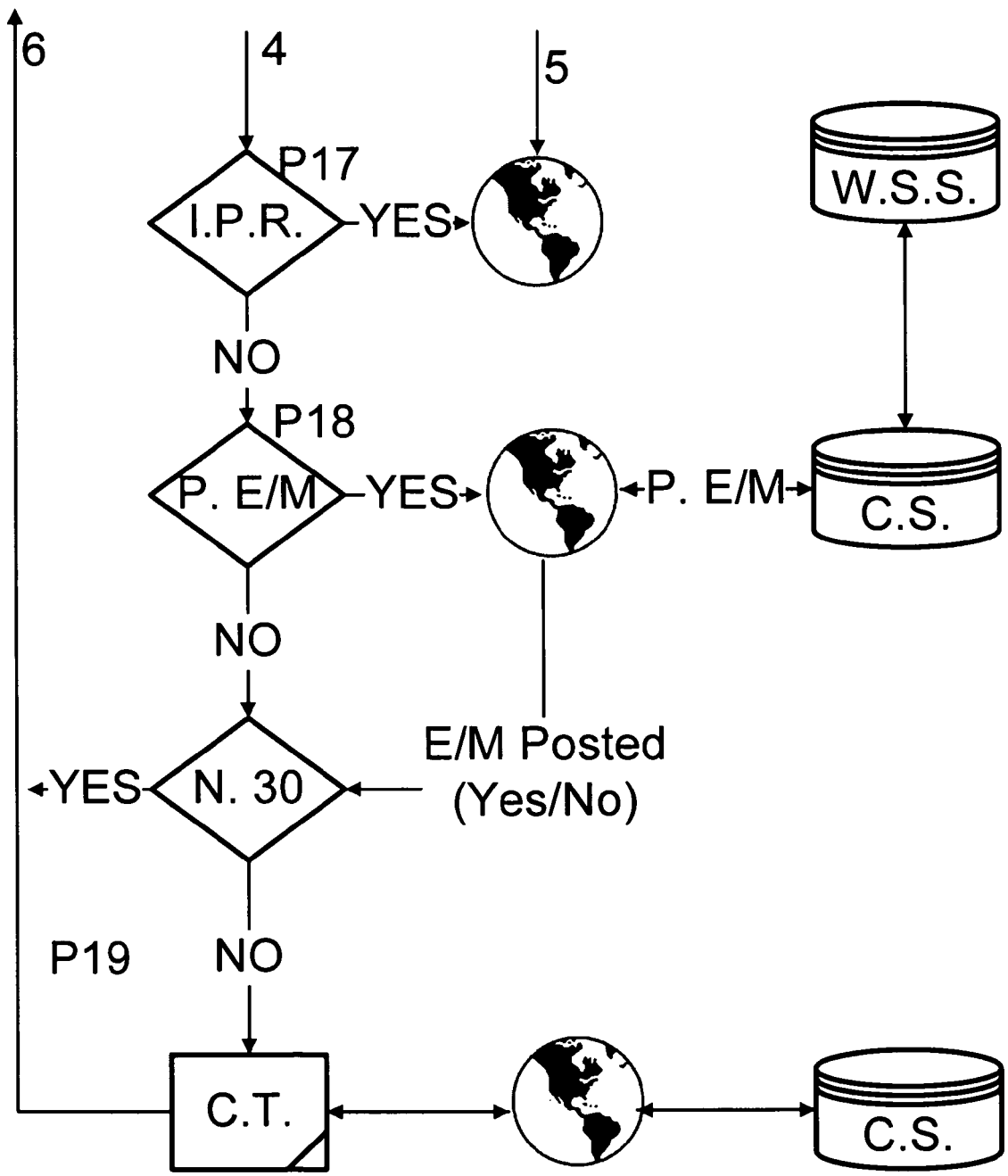

The present invention then provides for the provisioning of the subject handset, as more completely described in conjunction with FIGS. 3A-C. During the general and provisioning processes of a first subject handset, or once the provisioning process is completed, general and provisioning processes of multiple other subject handsets may be initiated, processed, and completed. If there is no general or provisioning process running, the CA enters a standby mode. From the standby mode, a user may provision a second, third, or more subject handsets, review provisioning reports of transactions in relation with preconfigured hierarchy/user rights, have a stand alone RF, or sensitivity, test performed, access the CA settings, or exit from the CA.

The CA settings allow the user to make configuration changes, such as modifying the Uniform Resource Locator ("URL") to the CS. The present invention allows the user to configure the mode of the operation of the CA to single handsets (one by one handset provisioning regime), or multiple handsets (bulk, multitasking handsets provisioning). The user may administer the COM ports by setting the maximum number of COM Ports to scan, or set COM ports to be ignored in the COM port scan. The user may check the Media Access Control ("MAC") address of the user's PC, or shortcut to the device manager of the user's PC. The present invention provides for a ESN-MEID calculator, allowing ESN hex to dec and dec to hex, MEID hex to dec and dec to hex, and MEID hex to pESN hex. Or, the user can exit from the CA.

The stand alone RF, or sensitivity, test is provided for in step P9. The user can select to have the CA perform a stand alone RF signal test without performing complete provisioning process. The steps for the stand alone, and provisioning integrated, RF tests are essentially the same—both compare the subject or test handset to a calibration handset. For the RF Test, the SID and channel frequency of the test handset are identified, the calibration handset locks to the identical SID and frequency, the calibration test scans the frequency and runs analysis comparing neg-gain criteria between the test and the calibration handsets in relation to the preconfigured value set and stored on the CS (per Master Account). The RX power is analyzed. And, the results in relation with neg-gain criteria are displayed.

Figure 4A:
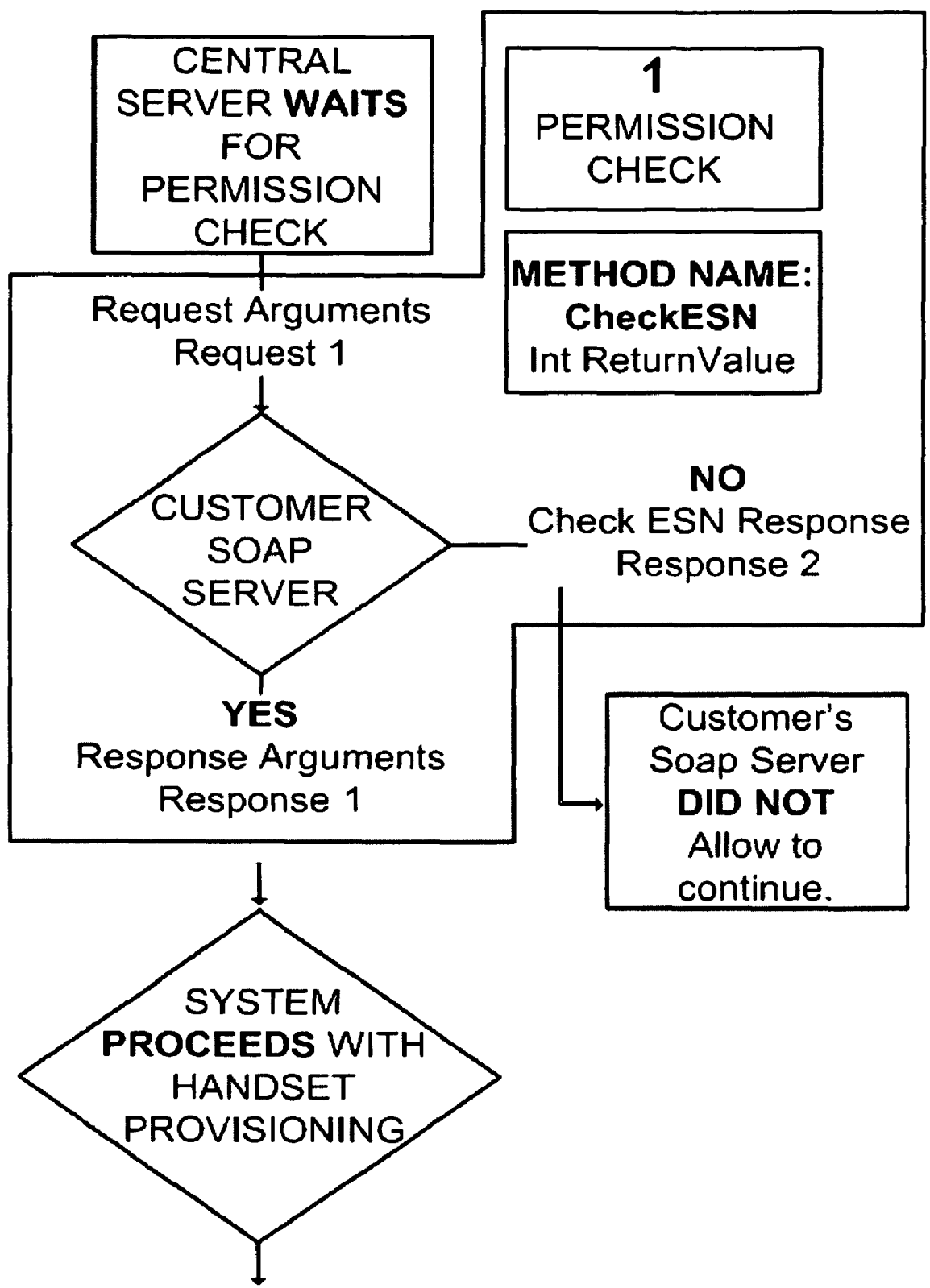
FIGS. 4A-B. make up a flow chart illustrating the gateway transaction data description for the carrier as implemented by the present invention.
Figure 4B:
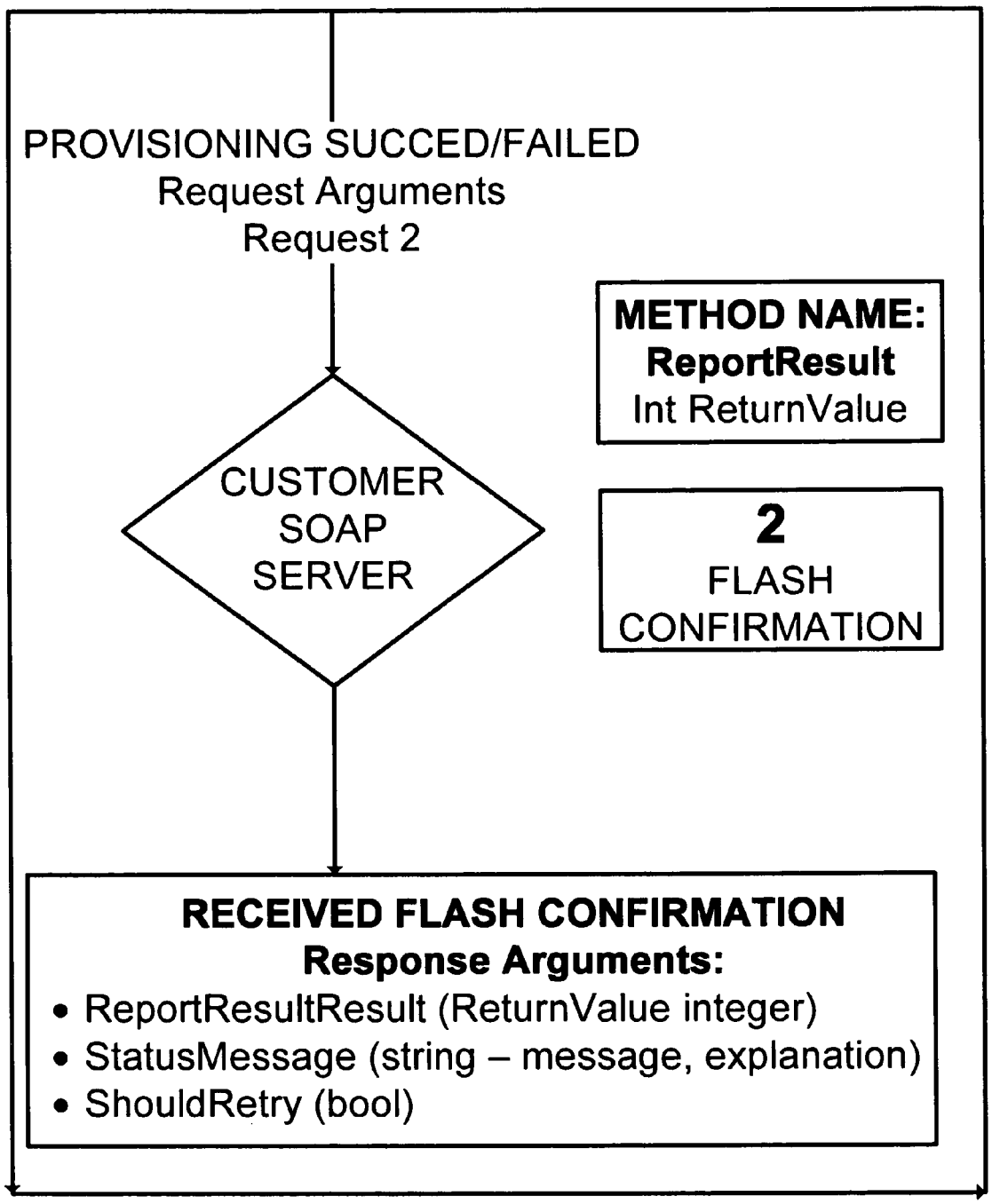

FIGS. 3A-C illustrate the provisioning process of the present invention. Abbreviations used in FIGS. 3A-C are as follows:

C.A.C.=Check Available Credits
E.C.A.=End Client Application
RF S.T.=RF Signal Test
P.H.I.=Pulling Handset Information
C.S.=Central Server
P.T.C.=Permission to Continue
U.H.=Unlock Handset
PRI L.=PRI Load
PRL L.=PRL Load
W.S.S.=WSP SOAP Server
I.P.R.=Inform Provisioning Result
P. E/M=Post ESN/MEID
C.T.=Charge Transaction All process steps of the provisioning process are configurable, non-compulsory and in changeable order and are provided by the CS to the CA in P8 of the General Process. Step P10 is the available credit check. Step P11 is the RF test. In step P12, the handset's electronic identifying information is obtained by the CA from connected handsets. In step P13, the CS requests from the wireless service provider ("WSP"), using Simple Object Access Protocol ("SOAP") server permission to continue with provisioning. This feature provides the flexibility to the WSP so as to control provisioning flow. If the WSP SOAP server does not grant permission to continue with handset provisioning, the process will stop. The interface process flow is more fully described in conjunction with the gateway transaction data description for carrier (soap server interface) and FIGS. 4A-B.

In step P14, the subject handset is unlocked from the old carrier. In order to unlock the handset, the CA performs an algorithm that is specific to both the model of the connected handset and the old carrier. The specified algorithm is received from the CS in P8 of the general process. Although there can be other values used, in a given embodiment of the present invention, the service provider code ("SPC") and the master subsidy lock ("MSL") of the subject handset are reset to zeroes. Because the SPC and MSL values are no longer specific to the old carrier, the handset is no longer "locked" to that carrier.

Reconfiguring of the handset takes place in step P15. The PRI is reconfigured. Possible PRI data parameters (a number of PRI parameters are set in relation with the handset model and chosen Carrier) include:

Analog First Paging Channel
AMPs Home SID
Home SID, Foreign SID and Foreign NID Reg
EVRC Enable
CDMA Primary and Secondary A and B Channels
Mode Preference
SPASM
20 Home SID/NID Pairs
Banner
MMS Server Name
User Agent Profile URL—We Set to Default For Carrier
MMS Host
MMS Subscriber ID
WAP Server Primary URL
WAP DNS and Ports
WAP Homepage URL
PPP Authentication
Set to Simple IP Only
NAI Profile
BREW IP or URL
BREW WSP ID In step P16, the PRL loading algorithm is performed by the CA. There are a number of loading algorithms. The loading algorithm is used that is specific to the model of the connected handset and the chosen carrier (received from the CS in P8 of the General Process).

In step P17, the CS informs WSP SOAP Server of the result of the provisioning—whether there was success or failure.

In step P17, the CS posts the ESN/MEID only of the successfully provisioned handsets to WSP.

In step P19, if the transaction was prepaid, then each successfully performed provisioning transaction is charged by the CS with preconfigured value, calculated in relation with the master account initial price per transaction and total deposit. If the transaction was not prepaid, then this step is ignored.

FIGS. 2A-C. comprise a flow chart illustrating the gateway transaction data description for carrier (soap server interface). FIGS. 2A-C. comprise a flow chart illustrating the gateway transaction data description for the carrier as implemented by the present invention. A SOAP server conducts a permission check to determine whether provisioning of the subject handset will be allowed. The arguments used in this request 1 are: Master Account(string), Manager Account(string), UserName(string), MACAddress(string), HandsetBrand(string), HandsetModel(string), OldAreaCode(string), OldNumber (string), OldMDN(string), ESNorMEID(string), SignalStrengthDifference(double), ReferenceID(integer) OUTPUT, statusMessage(string) OUTPUT, ShouldRetry(bool) OUTPUT. After receiving requested arguments, the client SOAP server returns a positive or negative response as to whether the handset will be allowed to be provisioned. The arguments used in this response 1 are: CheckESNResult (ReturnValue:integer—0), ReferenceID (integer—unique_reference_number), StatusMessage (string—Not Used), ShouldRetry (bool—Not Used). If the response is yes, the CA proceeds with the handset provisioning. If no, then provisioning is not allowed.

The second determination by the SOAP server concerns the success or failure of the provisioning process. Once again, the SOAP server requests certain arguments from the handset to determine the success of the provisioning process. The arguments used in this request 2 are: ReferenceID(integer—unique_reference_number), IsFlashed(bool—true—false), StatusMessage(string_message explanation) OUTPUT, ShouldRetry(bool) OUTPUT. Once determined, the user can be notified of the success or failure of the process. The arguments used in response 2 are: CheckESNResult (ReturnValue:integer—NOT 0), ReferenceID (integer—-1), StatusMessage (string—message, explanation error), ShouldRetry (bool).

While the present invention is not intended to be exclusively controlled by computer programs or algorithms on the Internet, it is intended that the present invention can be implemented and controlled by computer programs or algorithms over the Internet, or other computer network. Therefore, the present invention contemplates a series of computer algorithms and method by which the present invention is implemented and controlled. Thus, in some of the descriptions herein, the present invention is presented partly in terms of process steps and operations of data bits within a computer memory. An algorithm is here, and generally, conceived to be a self-consistent sequence of steps leading to a desired result. These steps are those requiring physical manipulations of physical quantities. In the present invention, the operations referred to may be automated, machine operations done by a computer or similar device performed in conjunction with a human operator.

The present invention relates to the methods for operating such devices, and processing electrical, magnetic, optic, or other physical signals to generate other desired physical signals. It further relates to a computer program and the control logic contained therein. The present invention also relates to apparatus for performing these operations. The apparatus may be specially constructed for the required purposes or it may comprise a general purpose computer including a nontransitory computer readable medium selectively controlled or reconfigured by a computer program stored in the memory of the computer. Further, because the present invention is intended to include a network of participants, with no geographic limitations, it is contemplated to better implement the system of the current invention, at least part of such implementation will take place on the Internet, or other computer network. The method presented herein is not inherently related to any particular computer or other apparatus. Similarly, no particular computer programming language is required. The required structure, although not machine specific, will be apparent from the description herein. Additionally, even though a specific device or software application may, or may not, be mentioned in conjunction with a step, or algorithm, or action, it is intended that any appropriate device or software application necessary or capable of implementing that step, or algorithm, or action is anticipated herein. For example, if a step calls for the input of data, it is contemplated that any appropriate devices such as, but not limited to, various input devices, output devices, data storage devices, data transfer devices, could be used and are anticipated herein.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A system for allowing users to universally reprovision wireless devices, said system comprising:
a computer system including a computer server and a plurality of Personal Computer (PC) terminals connected in a network with said computer server;
a communication cable connectible between a first of said PC terminals and a wireless device of any of more than ten different makes of wireless devices, the wireless device being configured to access a wireless telecommunication network of any first carrier, said communication cable including a power conductor for conveying a battery recharging current from said computer PC terminal to the wireless device;
said computer system being programmed to perform a method for reprovisioning any of said more than ten different makes of wireless devices, the method including the steps of:
controlling said PC terminal to scan its communication ports for the wireless device;
identifying the wireless device by sampling at least two of a group of identifying electronically readable characteristic of the wireless device in order to determine a digital signature of the wireless device, wherein said digital signature of the wireless device is made up of a combination of the wireless device's identifying electronically readable characteristics, said identifying electronically readable characteristics being taken from a list that includes at least two of: a firmware name, a firmware version, a hardware version, a firmware release date, a hardware release date, a hardware build date, a name of the firmware bin file, an Electronic Serial Number (ESN), a hardware brand, a hardware model, a Mobile Equipment Identifier (MEID), a Mobile Device Number (MDN), a First Mobile Identification Number (MIN1), and a Second Mobile Identification Number (MIN2);
matching the identified wireless device identified by said computer system to a group of settings that match at least two of said identifying electronically readable characteristics of the wireless device identified by said computer system;
allowing the user to choose a new carrier from a group of potential carriers;
verifying settings for said new carrier and the wireless device from model settings;

comparing Radio Frequency (RF) signals of said wireless device to a calibration wireless device in order to qualify the wireless device;

performing an RF sensitivity test to screen the wireless device for RF performance, said RF sensitivity test including comparing readings from the wireless device relative to a maximum permissible degradation to a calibration handset to qualify the wireless device;

when the handset is determined to qualify, modifying settings of the wireless device so as to electronically unlock said the wireless device to enable reconfiguration of operating parameters for the wireless device;

reconfiguring parameters of the wireless device so as to electronically enable said the wireless device to access a wireless telecommunication network of said new carrier;

and generating a report reflecting whether the wireless device qualified and containing the success or failure the reprovisioning, whereby the wireless device is modified to access the wireless telecommunications network of said new carrier rather than the wireless telecommunications network of the first carrier.

2. A non-transitory computer-readable medium containing instructions for controlling a computer system for allowing a user to provision a wireless handset by said non-transitory computer-readable medium implementing a method comprising the steps of:

controlling a Personal Computer (PC) to scan its communication ports for the wireless handset;

sampling at least two of the identifying electronically readable characteristics of the wireless handset to determine the digital signature of the wireless handset, wherein said digital signature of the handset is made up of a combination of the handset's identifying electronically readable characteristics, said identifying electronically readable characteristics being taken from a list that includes at least two of: a firmware name, a firmware version, a hardware version, a firmware release date, a hardware release date, a hardware build date, a name of the firmware bin file, an Electronic Serial Number (ESN), a hardware brand, a hardware model, a Mobile Equipment Identifier (MEID), a Mobile Device Number (MDN), a First Mobile Identification Number (MIN1), and a Second Mobile Identification Number (MIN2);

matching the wireless handset identified by the PC using at least two of the identifying electronically readable characteristics to a group of settings that match the identified wireless handset identified by the PC;

allowing the user to choose a new carrier from a group of potential carriers;

verifying settings for said new carrier and the wireless handset from model settings;

performing an RF sensitivity test to screen the wireless handset for RF performance, said RF sensitivity test including comparing readings from the wireless handset against a maximum permissible degradation to a calibration handset to qualify the wireless handset;

when the handset is determined to qualify, modifying settings of the wireless handset so as to electronically unlock the wireless handset from an old carrier;

loading parameters of the wireless handset so as to electronically reconfigure the wireless handset to said new carrier; and generating a report containing the success or failure of the provisioning of the wireless handset, whereby the wireless device is modified to access the wireless telecommunications network of said new carrier rather than the wireless telecommunications network of another carrier.

3. An article of manufacture comprising: a non-transitory computer useable medium having computer readable program code means embodied therein for allowing a user to provision a wireless handset including:

computer readable program code means from causing a Personal Computer (PC) to scan its communication ports to confirm said connection to wireless handset;

computer readable program code means for causing the sampling of at least two of the identifying electronically readable characteristics of said wireless handset in order to determine the digital signature of said wireless handset, wherein said digital signature of said wireless handset is made up of a combination of said wireless handset's identifying electronically readable characteristics, said identifying electronically readable characteristics of said wireless handset being taken from a list that includes at least two of: a firmware name, a firmware version, a hardware version, a firmware release date, a hardware release date, a hardware build date, a name of the firmware bin file, an Electronic Serial Number (ESN), a hardware brand, a hardware model, a Mobile Equipment Identifier (MEID), a Mobile Device Number (MDN), a First Mobile Identification Number (MIN1), and a Second Mobile Identification Number (MIN2);

computer readable code means for causing the matching of said wireless handset identified by said computer readable program code means using at least two of said identifying electronically readable characteristics of said wireless handset to a group of settings that match said identified wireless handset identified by said computer readable program code means which cause the matching of said wireless handset to a matching group of settings;

computer readable program code means for causing said user to be allowed to choose a new carrier from a group of potential carriers;

computer readable program code means for causing verification of the settings for said new carrier and said wireless handset from model settings;

computer readable program code means for performing an RF sensitivity test to screen said wireless handset for RF performance, said RF sensitivity test including comparing readings from said wireless handset against a maximum permissible degradation to a calibration handset to qualify said wireless handset;

computer readable program code means for causing, when the handset is determined to qualify, the modifying of settings of said wireless handset so as to electronically unlock said wireless handset from an old carrier;

computer readable program code means for causing the loading of parameters of said wireless handset so as to electronically reconfigure said wireless handset to said new carrier;

computer readable program code means for causing the generation of a report containing the success or failure of said provisioning of said wireless handset whereby the wireless device is modified to access the wireless telecommunications network of said new carrier rather than the wireless telecommunications network of another carrier.

* * * * *